July 6, 1954
E. O. FISCHER, JR
2,682,982
VEHICULAR FISHING ROD CARRIER WITH
UNIVERSAL ROD-EMBEDDING HOLDER
Filed Oct. 9, 1952
2 Sheets-Sheet 1
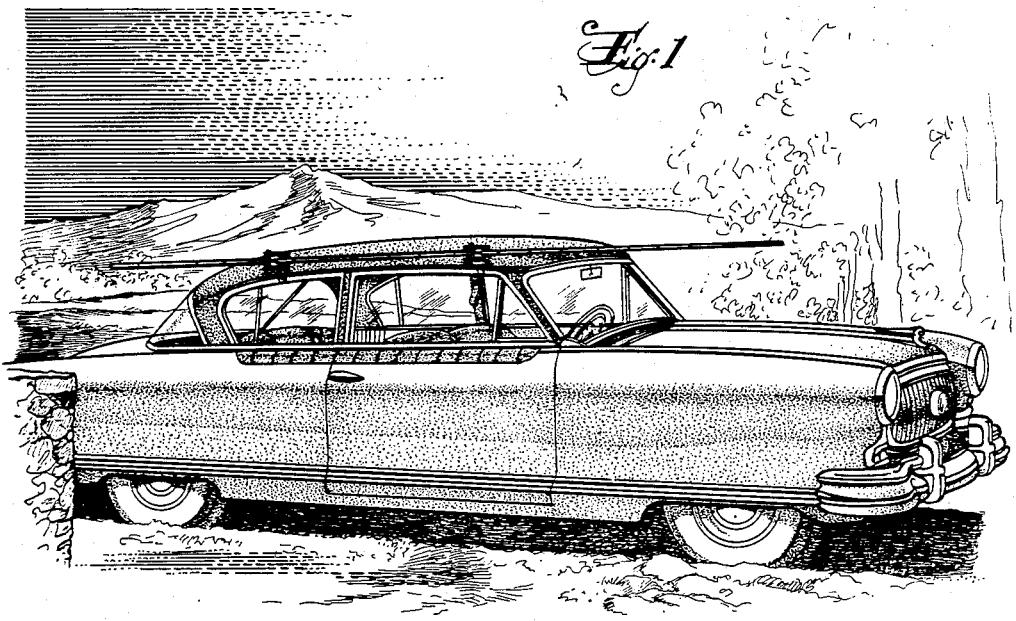
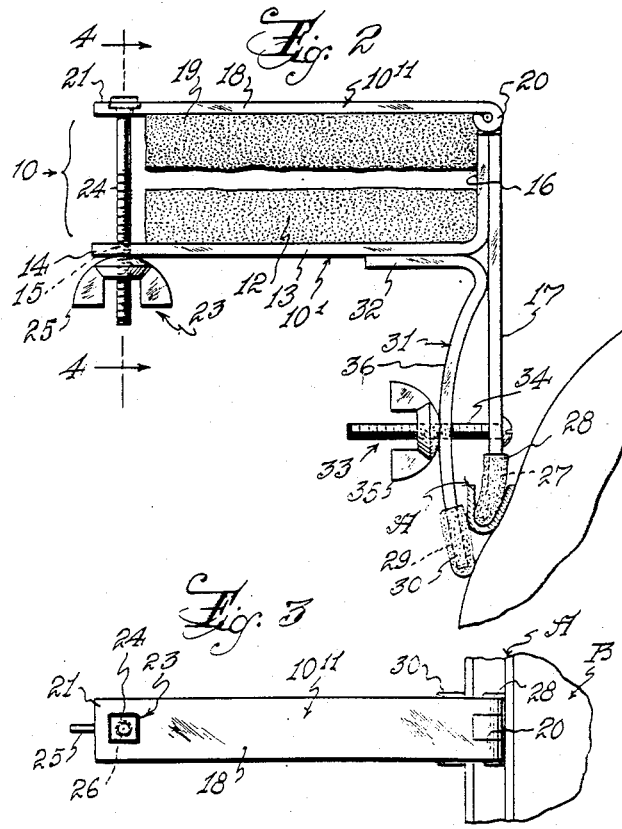
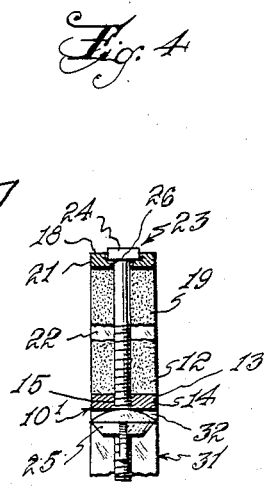
Inventor:
Ernest O. Fischer Jr.
BY Dudley B. Howard
Attorney.

July 6, 1954
E. O. FISCHER, JR
2,682,982
VEHICULAR FISHING ROD CARRIER WITH
UNIVERSAL ROD-EMBEDDING HOLDER
Filed Oct. 9, 1952
2 Sheets-Sheet 2
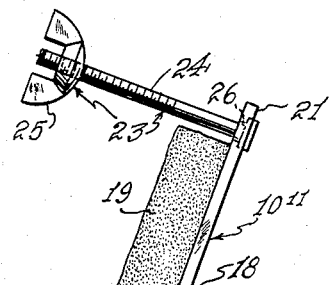
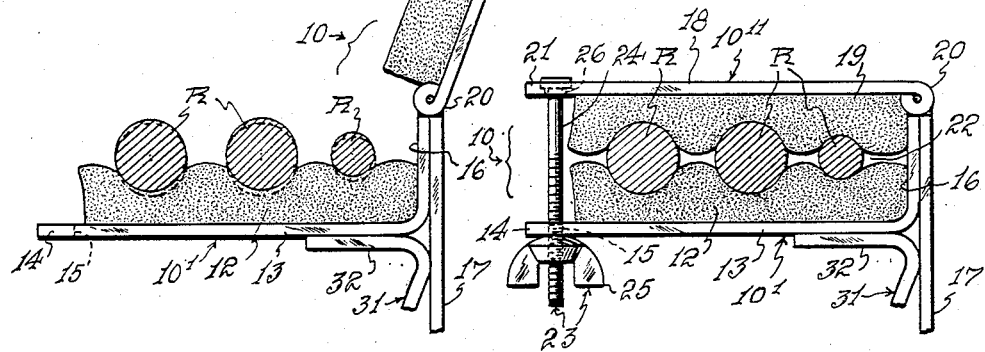
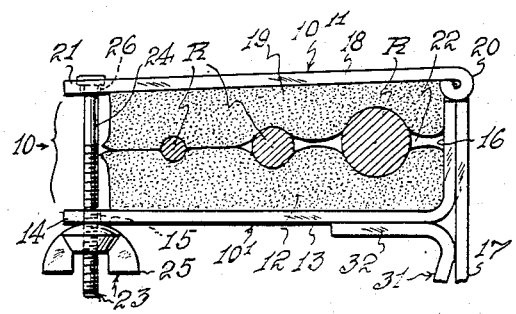
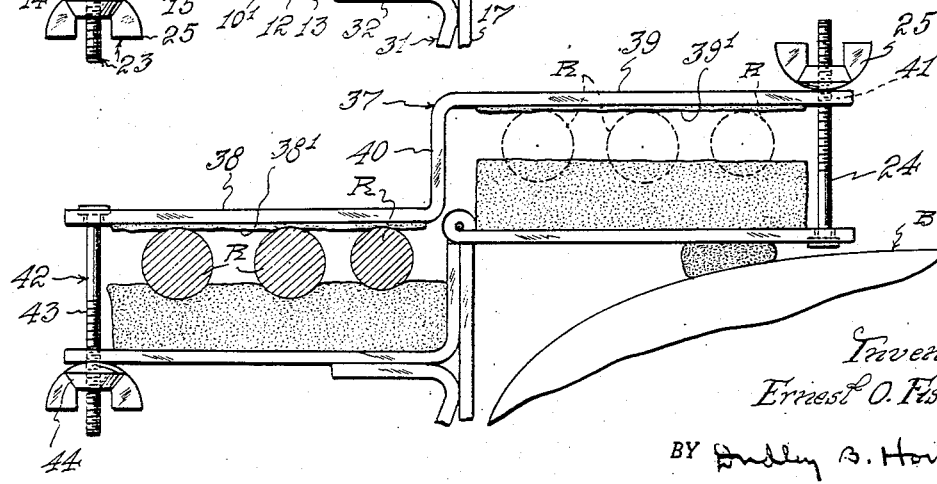
Inventor:
Ernest O. Fischer Jr.
BY Dudley B. Howard,
Attorney.

Patented July 6, 1954

2,682,982

UNITED STATES PATENT OFFICE 2,682,982

VEHICULAR FISHING ROD CARRIER WITH UNIVERSAL ROD-EMBEDDING HOLDER

Ernest Otto Fischer, Jr., Leonia, N. J.

Application October 9, 1952, Serial No. 313,914

4 Claims. (Cl. 224—42.1)

The invention relates to demountable devices for carrying long fishing rods or poles on the exterior of the body of an automobile or other vehicle while en route to and from fishing waters.

Vehicular carriers of the class to which my invention belongs have several common characteristics. To enumerate, all of them are intended to be used in pairs for attachment to the body of a vehicle in tandem at widely spaced fore-and-aft locations to insure rigidity of the load of fishing rods relative to said body. Each carrier unit of a pair comprises a holder for direct engagement with one or more rods and means cooperatively combined with said holder for attaching the latter to a vehicle body. Moreover, the attaching means usually is designed to clampingly fit a standard structural element of nearly all modern automobile bodies which happens to be suitably located for the purpose, namely, the rain gutter that overhangs the doors and windows on each side of the body.

The prior art devices, however, possess certain disadvantages. For instance, the rod holder of each carrier unit almost invariably has a crotched rest for the supported load of fishing rods and cooperative strap means to bind the several rods of the load together in a piled-up bundle or sheaf and to secure said bundle in the crotched rest. Bundling of the rods is objectionable in itself, due to the chafing contact of the rods which results from road motion of the vehicle. Then, too, the necessity of tying and untying the securing straps is very tedious and at times may be difficult or even impossible of accomplishment, as when the strap knots have become shrunk tight and hard from driving in the rain. When the straps are provided with buckles, the securing means may be manipulated more readily and quickly, but there is the disadvantage that the buckle tongue holes in the straps may not be suitably spaced to permit tight binding of rod bundles of all sizes, with the result that looseness and consequent rattling and aggravated rubbing contact between rods can occur.

I am aware of one prior art fishing rod carrier which improves upon the strap means for securing the rods in the holder by employing relatively adjustable clamping jaws having rubber-faced sockets designed to embrace individual rods with a view to preventing rubbing contact and rattling, but the intended object will not be attained whenever the particular rods to be transported do not happen to fit in the available sockets.

In addition to the above enumerated defects of the rod holder elements of the earlier carriers, the means by which the said holder elements are attached to, and supported by, an automobile body are usually either undesirably complicated in construction or incapable of mounting the holder elements in a sufficiently stable and secure condition when subjected to road motion.

With these objectionable characteristics of the prior art devices in mind, it is my primary object to improve upon the rod holder element of the combination by providing one which is adapted to universally fit the several fishing rods of possibly varying cross-sectional shapes and dimensions and at the same time maintain them in spaced relation to each other so that chafing cannot occur.

To be more explicit, the improved holder includes as its principal novel feature a rod seating member in the form of a block of soft, elastic material, such as sponge rubber. This seating member preferably is constructed and arranged to present a flat horizontal upper surface upon which the rods to be transported may be laid side by side in spaced relation. Each rod will become embedded in the seating member to a depth depending upon its weight. To retain the rods in their seated positions, I have provided a retainer element which is adapted in closed position to overlay the seating member in contact with the respective fishing rods to rest thereon and thereby add its weight to that of the rods themselves. As a result of the added weight, the rods will become even more deeply and securely embedded.

Another object of the invention is to provide simple and easily manipulated clamp fastener means for securing the retainer element of each holder in closed position and also to make the said clamp fastener means adjustable so that the degree of embedment of the rods may be controlled with particular attention to those of small diameter.

A further object is to provide vehicle attaching means for each rod holder which includes an upright standard to support the holder at a substantial height above the top of the vehicle body so as to avoid whipping contact between the pliable tip ends of the fishing rods and said body. Because it is desirable to use strap metal in fabrication of the principal structural members of the entire carrier, the upright standard will be subjected to considerable lateral bending stress by sway of the load when the vehicle goes around a bend in the road. To compensate for this stress, I have devised rain gutter clamping means, also made of strap metal, which cooperates in a novel manner with the supporting standard and with the rod holder, whereby the rigidity and stability of the load supporting means as a whole is materially increased.

The above and other objects, features and advantages of the present invention will be more fully understood from the following specific description when considered in connection with the accompanying drawings, in which:

Fig. 1 is a fragmentary side elevation of an automobile body, showing a pair of the improved carrier devices attached thereto in supporting relation to a load of fishing rods;

Fig. 2 is a detail large-scale front elevation of one of the carrier devices in attached position on an automobile body (broken away) but not loaded, showing the retainer element secured in closed position; Fig. 3 is a plan view of the same; and Fig. 4 is a vertical section on line 4—4 of Fig. 2.

Fig. 5 is a front elevation of a holder with attaching means broken away, showing the retainer element in open position and a load of fishing rods resting upon the seating member; Fig. 6 is a similar view, showing the retainer element closed in the normal position illustrated in Fig. 2; and Fig. 7 is a similar view, showing the retainer element as being clamped down more tightly in closed position to securely grip an included rod of very small cross-sectional diameter.

Fig. 8 is a view similar to Fig. 6, showing a supplementary retainer element applied to the carrier to convert the main retainer element into a holder element and thereby double the rod carrying capacity.

Referring now in detail to the drawings, in which like reference characters designate corresponding parts in the several views, Figs. 2 to 4 in particular illustrate the complete carrier device in supported attachment to the rain gutter A of an automobile body B. The said complete device comprises a rod holder 10 and cooperatively combined vehicle attaching means 11. It is to be understood that it is within the scope of the invention to modify the structure of the attaching means to adapt the same to attachment to some convenient structural element of other land, water or air vehicles as may be desired.

Rod holder 10 will be described in detail first because it includes the novel feature of primary importance, e. g. the elastic, level-surfaced seating member 12, which forms part of stationary holder element 10'. This seating member 12 should be elastic and soft to a degree which will permit embedment of fishing rods to a considerable depth due to their respective weights alone. A material which satisfactorily meets this requirement is sponge rubber.

Seating member 12 preferably is in the form of an elongated rectangular block of vertical thickness somewhat less than half the diameter of the thickest conventional fishing rod likely to be transported. It being essential to proper functioning of seating member 12 that it shall be maintained in its general rectangular shape and that it shall be rigidly supported in that condition, the said member is affixed adhesively or in any other suitable manner to the upper horizontal face of a rigid, comparatively inelastic supporting or backing member 13, which also forms part of stationary holder element 10'.

For the sake of simplicity and economy of manufacture, it is preferred to utilize strap metal in the construction of supporting member 13 and nearly all of the other rigid structural members of the carrier. Therefore, supporting member 13 is formed by one end portion of a blank constituted by a suitable length of strap metal. The end portion reserved for member 13 should be just long enough to accommodate seating member 12 with a projecting flange 14 at its extreme outer end which is provided with a central, open-ended slot 15 for a purpose to be explained later herein.

As shown in Figs. 3 and 4, seating member 12 is equal in width to supporting member 13, whereas its length should be sufficient to permit a customary load of rods for a one-car fishing party to be laid thereon with sufficient inter-rod spacing to insure properly separated bed depressions for the individual rods. As indicated in Figs. 1 and 2, the mounted position of each carrier is such that the seating member 12 and its supporting member 13 of holder element 10' will be arranged at right-angles to the fore-and-aft axis of the supporting vehicle body.

At the opposite end of seating member 12 from the slotted flange 14 of supporting member 13, the strap metal blank out of which said supporting member is formed is bent perpendicularly upward to provide a wall 16 that rises to a height slightly in excess of twice the vertical thickness of seating member 12 for a reason to be explained later herein. Wall 16 preferably abuts the inner end face of seating member 12 and may be adhesively affixed thereto in order to prevent the innermost fishing rod of a load from drifting into chafing contact with said wall. At the top of wall 16, the strap metal blank is bent reversely downward in contact with the outer face of said wall and is extended below the level of supporting member 13 to provide an upright standard 17 which constitutes part of vehicle attaching means 11 to be described in detail later.

A movable primary retainer element 10" is cooperatively associated with supporting member 13 to retain the fishing rods in seated position on seating member 12. In order to protect the rods against chafing contact with any hard structural material and also to augment the effect of embedment in seating member 12 in securing the rods against lateral displacement in holder 10, it has been found expedient to substantially duplicate stationary holder element 10' in the construction of retainer element 10". To this end, retainer element 10" comprises a flat, elongated supporting member 18 of strap metal and a pressure member 19 of soft, elastic material, such as sponge rubber. These members 18 and 19 match the respective members 13 and 12 in size and form. The inner end of supporting member 18 is hinged to the upper edge of wall 16 as at 20. In this instance, pressure member 19 is affixed to the inner face of supporting member 18 so as to be directly opposed to seating member 12 when movable retainer element 10" is in the closed position relative to stationary holder element 10' disclosed in Fig. 2. As in the stationary holder element 10', a projecting flange 21 is provided adjoining the outer end of pressure member 19. As shown also in Fig. 2 and previously intimated herein, the height of wall 16 bears such relation to the thickness of seating member 12 and its counterpart pressure member 19 that a clearance space 22 is provided between said members to accommodate the wide axial portions of large fishing rods which require excessive pressure to force embedment which is not needed, since the narrow lower and upper portions will be secured by their embedment against lateral displacement to a sufficient degree of firmness.

In order to fasten retainer element 10" in the closed position shown in Fig. 2 and also to permit precise clamping adjustment of pressure member 19 toward seating member 12 for tight gripping engagement between said members and interposed fishing rods, adjustable clamp fastener 23 has been provided in operative connection with the respective end flanges 14 and 21 of supporting members 13 and 18. For this purpose, I prefer to use a simple bolt 24 and wing-nut 25. A convenient arrangement is to have the head end of bolt 24 loosely engaged with flange 21 of supporting member 18, as by insertion through a hole 26 in the latter of sufficient diameter to permit angular rocking motion of the bolt therein. The opposite end portion of bolt 24 will be free for detachable engagement in slot 15 of flange 14 of supporting member 13. When nut 25 is screwed up tight against flange 14, the desired clamping action of the seating and pressure members in relation to a load of fishing rods may be effected easily and with precise application of gripping force.

The attaching means 11 by which holder 10 may be mounted upon the body of an automobile includes standard 17, as already mentioned. For this purpose, the lower end of standard 17 is curved inward slightly to form a stationary clamping jaw 27 for engagement within the upwardly open U-shaped rain gutter A of body B. To protect the paint or enamel inside coating of rain gutter A, stationary clamping jaw 27 may be sheathed within a rubber cap 28 as shown. For operative cooperation with stationary clamping jaw 27, a movable clamping jaw 29, which is similarly sheathed within a rubber cap 30, is formed at the lower end of a combined brace-clamp member 31 that is made of strap metal and is adapted to be positioned facing the inner side of standard 17. Brace-clamp member 31 has a lateral bracket arm 32 formed at its upper end for supporting contact with the underside of supporting member 13 of stationary holder element 10'. The length of brace-clamp member 31 is such that movable clamping jaw 29 will project below stationary clamping jaw 27. Movable clamping jaw 29 is bent oppositely to stationary clamping jaw 27 in order that the former may bear evenly against the outer side face of rain gutter A and also reach under said gutter for endwise abutment against automobile body B. Clamping means 33 is provided to permit movable clamping jaw 29 to be forced toward stationary clamping jaw 27 for gripping engagement with the outer side wall of rain gutter A in rigidly attaching the carrier to the vehicle body. As being suitable for this purpose, I have chosen to use bolt 34 and wing-nut 35, which may be readily adjusted manually. Bolt 34 preferably penetrates standard 17 and brace-clamp member 31 with its head end engaged with said standard so that wing-nut 35 may be conveniently located in a readily accessible position facing away from the automobile body.

The portion of brace-clamp member 31 which is penetrated by clamp bolt 34 and engaged by wing-nut 35 is preferably bowed away from standard 17 as at 36. The reason for this structure is to permit intentional increases in the effective length of brace-clamp member 31 when the clamping means 33 is tightened sufficiently to have a straightening influence on the inherently resilient bowed portion 36 thereof. The effect of lengthening brace-clamp member 31 will be to thrust movable clamping jaw 29 tightly against automobile body B with reacting thrust of bracket arm 32 against the under face of holder 10, whereby the rigidity of the supporting means for said holder may be increased as desired.

The mode of operation of the improved carrier will now be described with the aid of Figs. 5 to 7, inclusive. The vehicle attaching means has been omitted from these views to simplify the disclosure, it being understood, of course, that two carrier units are mounted in tandem on the vehicle body as shown in Fig. 1.

Fig. 5 represents the elevated, open position of retainer element 10" of holder 10 of one of the carrier units of a pair, which position is assumed to permit fishing rods R to be laid on seating member 12 in suitably spaced relation to each other and to metallic parts of holder 10. It will be noted that the weight of each rod causes it to become embedded in seating member 12 to a proportionate depth. Broken lines indicate the depth of embedment that may be expected when retainer element 10" has been lowered and clamped down by means of clamp fastener 23. When one rod happens to be smaller in diameter than the others, it should be placed adjacent to wall 16 as shown unless the disparity in diameters be too great for effective engagement of the small rod by seating and pressure members 12 and 19, respectively.

Whether the rods are arranged with those of smaller diameter on the inside or outside, or whether the pliable tip ends point forward or to the rear, are all matters of personal choice and ingenuity. In any event, each holder will engage the several rods in the manner depicted in either of Figs. 6 and 7 after the movable retainer element 10" has been lowered into closed position.

Fig. 6 shows the rods in the selected arrangement of Fig. 5. After retainer element 10" has been lowered, its weight will be added to that of the rods themselves so that the depth of embedment is seating member 12 will be increased to some degree. At the same time, the weight of retainer element 10" will cause proportionate embedment of the rods in pressure member 19. Additional embedment in members 12 and 19 to the depth considered to be necessary for proper security of the rods may be attained by swinging clamp fastener 23 downward until bolt 24 is engaged in slot 15 of supporting member 13 of holder element 10' and then tightening wing-nut 25 on bolt 24.

Whenever it is desired to include a rod of extremely small diameter in the load, such as a fly rod or plug-casting rod alongside one or more surfcasting rods of large diameter, the small rod should be placed on the outside of the others near clamp fastener 23, as shown in Fig. 7, so that abnormal tightening of the latter may be effected to close clearance space 22 and thereby cause the small rod to become sufficiently deeply embedded in seating member 12 and pressure member 19 for adequate security. It should be obvious that bolt 24 of clamp fastener 23 will serve to resist excessive endwise bulging of the free ends of seating member 12 and pressure member 19. Moreover, the screw threads of bolt 24 will dig into the said free ends of these members and thereby secure them against such separation under lateral wedging pressure of the outermost rod as might otherwise permit the said rod to be squeezed into objectionable chafing contact with said bolt.

Fig. 8 illustrates a supplementary retainer element 37 and the manner in which it may be used either to double the rod-carrying capacity of each carrier or to adapt the device to accommodation of rods or the like of exceptionally large diameter, such as tent poles for instance. Retainer element 37 is substantially twice as long as holder 10 and preferably is made from a blank of strap metal equal in width to the blanks used in fabrication of the rigid parts of holder element 10' and retainer element 10''. The blank is bent to provide two staggered, parallel retainer arms 38 and 39 which are united by perpendicular connecting portion 40. Retainer arm 39 has a slot 41 in its outer end for a purpose to be described presently. The purpose of supplementary retainer element 37 is to permit primary retainer element 10'' to be converted into a holder element substantially identical to holder element 10'. It will be observed upon reference to Fig. 8 that when primary retainer element 10'' is swung open to the position shown it will be inverted so that pressure member 19 faces upward and is well suited to serve as an additional seating member. However, it must be supported in that position and both it and seating member 12 require retainer means. Supplementary retainer element 37 serves all those purposes. When placed in the position shown, retainer arm 38 will be resting upon the load of rods R in holder 10 and may be clamped down in this position by means of clamp fastener 42 which is just like clamp fastener 23 and engages slot 15 in supporting member 13 in precisely the same manner. While converted holder element 19 (formerly retainer element 19) is manually sustained in a horizontal position, its clamp fastener 23 may be turned up into engagement with slot 41 in the end of retainer arm 39 which is now overlying said converted holder element. Supplementary retainer element 37 will now be retaining both loads of rods on their respective holder elements 10' and 10'' and will be supporting the latter securely in its new horizontal, inverted position. In order that retainer members 38 and 39 will not have direct, chafing contact with the fishing rods, they should be faced underneath with rubber as at 38' and 39'.

It will be understood that it is intended to cover all changes and modifications of the examples of the invention herein chosen for the purpose of illustration which do not constitute departures from the spirit and scope of the invention.

Having thus described the invention, I claim:

1. A fishing rod carrier adapted to be attached to an upwardly open U-shaped vehicle rain gutter having its inner side wall affixed to the vehicle body and its outer side wall free, said carrier comprising: a rod holder; and vehicle attaching means for said rod holder including a laterally flexible supporting standard integral with said holder at one side thereof and dependent therefrom for seating engagement within the vehicle rain gutter in a manner to cause the rod holder to project laterally outward from the vehicle body, the lower end of said supporting standard being adapted to serve as a stationary clamping jaw for internal engagement with the free outer side wall of the rain gutter, an elongated brace-clamp member arranged along the outer side of said supporting standard with its lower end constituting a movable clamping jaw for engagement with the free outer side wall of the rain gutter in cooperative opposition to the stationary clamping jaw, said movable clamping jaw being intermediately bowed laterally away from the supporting standard and constructed to project below the stationary clamping jaw and being bent laterally inward to underlie the latter for bracing contact with the vehicle body beneath the rain gutter, an outwardly projecting bracket arm provided at the upper end of the brace-clamp member for supporting engagement with the under side of the rod holder, and adjustable clamping means connecting the intermediate portion of the brace-clamp member with the supporting standard, whereby tightening of said clamping means will tend to straighten and elongate said brace-clamp member and thereby move the bracket upward and press the rod holder upward and rockingly inward to counteract outward bending stress imposed upon the supporting standard by the weight of the holder and its load.

2. A fishing rod carrier as defined in claim 1, wherein the rod holder is made of a single piece of resilient strap metal shaped to provide a horizonal rod supporting member, an upturned vertical wall at the inner side of said supporting member, and a reversely bent portion that depends from the top of said wall in contiguity with the inner face thereof to a sufficient extent below the rod supporting member to form the supporting standard for the rod holder.

3. A fishing rod carrier comprising: a stationary rod holder element including a rigid supporting member, and a block-form seating member of soft elastic material mounted upon said supporting member and being constructed and arranged to present a substantially flat and horizontal upper rod-embedding face; a movable primary retainer element including a rigid supporting member hinged at one side on a horizontal axis to the supporting member of the stationary holder element and being adapted to overlie the latter in closed position, and a block-form pressure member of soft elastic material affixed to the inner face of the supporting member of the primary retainer element for embedding engagement with fishing rods seated on the seating member of the stationary rod holder element; clamp fastener means to connect the side of the primary retainer element opposite to the hinged side thereof to the corresponding side of the stationary rod holder element; vehicle attaching means provided on the sationary rod holder element; the primary retainer element being free for swinging movement on its hinge inward into a horizontal position with its pressure member facing upward whereby said primary retainer element may serve as a converted rod holder element; an elongated supplementary retainer element adapted to overlie said stationary rod holder element and inswung primary retainer element for retaining contact with the rods seated on both of said elements, the clamp fastener means of the primary retainer element being adapted to connect its free side to the corresponding end of the supplementary retainer element to support the former element from the latter; and additional clamp fastener means to connect the opposite end of said supplementary retainer element to the free side of the stationary rod holder element, whereby the former element will be held down in horizontal position.

4. A fishing rod carrier as defined in claim 3, wherein the hinge side of the stationary rod holder element is bent upward into a wall rising above the rod-embedding face of the seating member thereof with the hinge located at the top of said wall, whereby the primary retainer element in inswung inverted position will be stepped upward from the stationary rod holder element; and wherein the supplementary retainer element is bent to form vertically staggered horizontal arms united by a perpendicular connecting portion that forms an inner rod confining wall for the converted rod holder element when said arms are arranged in inwardly and upwardly stepped relation conforming with the relative arrangement of said stationary and converted rod holder elements.

References Cited in the file of this patent

UNITED STATES PATENTS

| Number | Name | Date |
|---|---|---|
| 2,171,053 | White et al. | Aug. 29, 1939 |
| 2,288,442 | Felton | June 30, 1942 |
| 2,461,897 | Hopkins | Feb. 15, 1949 |
| 2,514,266 | Walslager | July 4, 1950 |
| 2,575,458 | Merrill | Nov. 20, 1951 |